United States Patent Office 3,097,240
Patented July 9, 1963

3,097,240
NOVEL SULFONYL-UREAS
Walter Aumüller and Gerhard Korger, Frankfurt am Main, Heinrich Ruschig, Bad Soden, Taunus, and Hans Wagner, Frankfurt am Main, Germany, assignors to Farbwerke Hoechst Aktiengesellschaft vormals Meister Lucius & Brüning, Frankfurt am Main, Germany, a company of Germany
No Drawing. Filed May 7, 1957, Ser. No. 657,477
Claims priority, application Germany May 23, 1956
2 Claims. (Cl. 260—553)

It is known to provide sulfonyl-ureas of the general formula $$R-SO_2-NH-CO-NH-R_1$$

in which R represents a phenyl radical which may contain one or two substituents selected from alkyl, alkoxy residues, of which the alkyl group is preferably of low molecular weight, and halogen atoms, or an aliphatic or cycloaliphatic hydrocarbon radical containing 3 to 8 carbon atoms, and $R_1$ represents an aliphatic or cycloaliphatic hydrocarbon radical containing 2 to 8 carbon atoms, as well as the salts thereof and a process for the manufacture of these compounds according to methods as may generally be applied for the manufacture of sulfonyl ureas. In detail, the following methods of preparation are, for example, mentioned, R representing in this connection, for example, the phenyl radical. The reaction may be effected by reacting benzene-sulfonyl-isocyanates with alkyl, alkenyl, cycloalkyl or cycloalkyl-alkyl-amines or by reacting alkyl, alkenyl, cycloalkyl or cycloalkyl-alkyl-isocyanates or such compounds as in the course of the reaction form such isocyanates, with benzene sulfonic acid amides; or by reacting benzene-sulfonyl-urethanes with alkyl, alkenyl, cycloalkyl or cycloalkyl-alkyl-amines or by reacting alkyl, alkenyl, cycloalkyl or cycloalkyl-alkyl-urethanes with benzene-sulfamides; or by reacting alkyl, alkenyl, cycloalkyl or cycloalkyl-alkyl-carbamic acid halides with benzene-sulfonic acid amides or benzene-sulfonyl-carbamic acid halides with alkyl, alkenyl, cycloalkyl or cycloalkyl-alkyl-amines; or by converting benzene-sulfonyl-ureas which are not substituted in the amino group into the corresponding alkyl, alkenyl, cycloalkyl or cycloalkyl-alkyl compounds; or by reacting alkyl, alkenyl, cycloalkyl or cycloalkyl-alkyl ureas with benzene-sulfonic acid amides; or by reacting corresponding isourea ethers, preferably in the form of the corresponding salts, with benzene-sulfonic acid halides and subsequently hydrolyzing the products thus obtained; or by desulfurizing the corresponding thio-ureas; or by preparing correspondingly substituted guanidines and hydrolyzing the products thus obtained; or by desulfurizing the corresponding thio-ureas; or by preparing correspondingly substituted guanidines and hydrolyzing them.

Now we have found that compounds of the general formula $$R-SO_2-NH-CO-NH-R_1$$

in which R represents a diphenyl-(4) or 4-phenoxy-phenyl radical or a naphthalene-(2) or a 5.6.7.8-tetra-hydro-naphthalene-(2) radical and $R_1$ represents an aliphatic or cycloaliphatic, saturated or unsaturated hydrocarbon radical with 2 to 8 carbon atoms or a saturated or unsaturated, open chain or cyclic hydrocarbon radical interrupted by oxygen and/or sulfur, and the salts of these compounds are valuable medicaments and are particularly distinguished by a high hypoglycemic effect.

The present invention relates also to the manufacture of such compounds according to processes as are generally applied for the manufacture of sulfonyl ureas. In particular, the following methods according to the invention are mentioned which are generally the same as have already been disclosed in the art.

It is possible, for example, to react sulfonyl-isocyanates of the formula $$R-SO_2-NCO$$

with compounds of the formula $R_1-NH_2$. However, it is also possible to obtain the desired ureas in a reverse reaction by reacting compounds of the formula $R_1-NCO$ with sulfonic acid amides of the formula $$R-SO_2-NH_2$$

For the reaction with the isocyanates the sulfonic acid amides are preferably used in the form of their salts, particularly in the form of the sodium or potassium salts. Furthermore, it is possible to prepare the new compounds by reacting sulfonyl-urethanes of the formula $$R-SO_2-NH-COO-R_2$$

in which $R_2$ stands for any desired, preferably low molecular, hydrocarbon radical, with compounds of the formula $R_1-NH_2$ or, conversely, sulfamides of the formula $$R-SO_2-NH_2$$

with urethanes of the formula $R_1-NH-COO-R_2$, in which $R_2$ stands for any desired, preferably low molecular, hydrocarbon radical. In many cases simple heating of the reactants to temperatures above 100° C. leads to particularly good yields. In addition, sulfonyl-carbamic acid halides of the formula $$R-SO_2-NH-CO-Hal$$

may, for example, be reacted with primary amines of the formula $R_1-NH_2$ or, conversely, sulfamides of the formula $$R-SO_2-NH_2$$

with carbamic acid halides of the formula $$R_1-NH-CO-Hal$$

When reacting sulfamides with ureas containing one aliphatic or cycloaliphatic substituent it can be of special advantage to apply the sulfamides in the form of their alkali metal salts and the urea derivatives in the form of correspondingly acylated or nitrated compounds and to heat the components in the absence of solvents to elevated temperatures, advantageously between 130 and 160° C.; conversely, a hydrogen atom in sulfonyl-ureas of the formula $$R-SO_2-NH-CO-NH_2$$

can be replaced by the radical $R_1$, for example, with the aid of low molecular primary amines of the formula $R_1-NH_2$. The reaction of sulfonic acid halides of the formula $$R-SO_2-Hal$$

with iso-urea ethers can, for example, be carried out in an aqueous medium in the presence of potassium carbonate when using solid sulfonic acid halides. According to an advantageous method of preparation the iso-urea ethers are reacted in the form of salts, in aqueous acetonic solution and, while cooling, with sulfonic acid halides in the presence of alkali metal hydroxide solutions. The sulfonyl-iso-urea ethers separating from the solution are sucked off and, if necessary, recrystallized from dilute alcohols. They are heated, for example, with concentrated acids, preferably hydrochloric acid, to temperatures ranging between about 60 and 100° C., gas being evolved at the same time. In a further process according to the invention sulfur is eliminated from corresponding sulfonyl-thio-ureas by means of heavy metal oxides in the presence of solvents; in this connection it can be of advantage to use, instead of the heavy metal oxides, corresponding metal salts, for example, lead, copper or silver salts. A further customary method of the desulfurization is the oxidation of the sulfonyl-thio-ureas with, for example, sodium peroxide or nitrous acid. Finally, it is also possible according to the process of the present invention to hydrolyze corresponding sulfonyl-guanidines which may be obtained in known manner, for example, by reaction of sulfonyl-cyanamides with a primary amine (cf. French specification 913,967 and British specification 595,472) or by reaction of sulfonic acid chlorides with alkyl guanidines in the presence of alkali, this suitably being effected by slowly heating the substances in aqueous solution with alkali hydroxides.

The reaction conditions under which the processes for the manufacture of the products of the present invention are carried out may vary within wide limits and can be adapted to each particular case. For example, the reactions may be carried out in many cases by simply heating the components but also with the use of solvents such as acetone, toluene, xylene and chlorobenzene at room temperature or at a higher temperature. In order to obtain the products of the present invention in as pure a state as possible it is advantageous to separate the product thoroughly from the benzene sulfamides used as starting material or formed in the course of the reaction. Advantageously, this is carried out taking up the products in dilute ammonia, wherein these ureas are relatively easily soluble, and reprecipitating them from the solutions by acidification with organic or inorganic acids.

Many of the starting materials suitable for use in the present process have been described in the literature. There may be mentioned, for example: 4-phenyl-benzene-sulfamide, 4-phenoxy-benzene-sulfamide, naphthalene-(2)-sulfamide and 5.6.7.8-tetrahydronaphthalene-(2)-sulphamide and also the urethanes, isocyanates, carbamic acid halides, ureas, sulfonic acid halides, thio-ureas and guanidines derived from these compounds. Instead of the sulfonyl-isocyanates there may also be used other compounds that behave like isocyanates in the course of the reaction.

For the reaction with the above-mentioned urethanes, isocyanates, carbamic acid halides and ureas there may, for example, be used the following primary amines: As alkylamines there may be mentioned, for examples, ethylamine, n-propylamine, isopropylamine, n-butylamine, isobutylamine, secondary butylamine, tertiary butylamine, pentylamine-(1), pentylamine-(2), pentylamine-(3), 3-methyl-butylamine-(1), 2-methyl-butylamine-(1), 2.2-dimethyl-propylamine-(1), 3-methyl-butylamine-(2), hexylamines, such as hexylamine-(1) and 2-methyl-pentylamine-(1), heptylamines, such as heptylamine-(1), heptylamine-(4), octylamines, such as octylamine-(1), As alkenylamines may, for example, be mentioned: Allylamine and crotylamine; as cycloalkylamines: Cyclohexylamine and cyclopentylamine; and as cycloalkyl-alkyl-amines cyclohexyl-methylamine and cyclohexyl-ethylamine. In addition, there may be used such aliphatic or cycloaliphatic compounds as are interrupted by oxygen or sulfur, for example, 2-methoxy-ethylamine, 2-ethoxy-ethylamine, 2-propoxy-ethylamine, 3-methoxy-propylamine, 3-ethoxy-propylamine, 3-butoxy-propylamine, 4-methoxy-butylamine, α-tetrahydrofuryl-methylamine, 3-methyl-mercapto-propylamine and 3-ethyl-mercapto-propylamine.

Instead of using the aforementioned amines, the corresponding isocyanates, urethanes, carbamic acid halides, ureas, acyl-ureas and isourea ethers (obtainable from the aforesaid amines) may be reacted according to the process of the invention with the aforementioned sulfonyl derivatives. Instead of isocyanates there may also be used other compounds reacting like isocyanates in the course of the reaction.

As has been demonstrated by experiments on rabbits, the products of the present invention produce a substantial lowering of the blood sugar level. They may be used as such or in the form of their salts, or in the presence of substances that cause salt formation. When, for example, normally fed rabbits are given compounds of the claimed structure in a single average dose of 400 mg./kg. in, for example, a solution rendered alkaline with bicarbonate or in the form of an alkali metal salt, a lowering of the blood sugar level sets in rapidly and reaches a maximum (about 30 to 50% of the initial value) in the course of about 3 to 4 hours.

The blood sugar values can be measured by hourly analyses by the method of Hagedorn-Jensen. The lowering of the blood sugar is determined by comparison with the blood sugar level of control animals fed in the same way but not so treated.

As compared with compounds of similar constitution of the sulfanilyl series the compounds of the present invention are distinguished, on one hand, in that they are more resistant to external oxidizing influences, such as atmospheric oxygen, which is of importance to their shelf-life and handling, and, on the other, in that they have no bacteriostatic action in contradistinction to the sulfanilyl compounds.

Furthermore, the new compounds to not produce the secondary effects of sulfamides on the blood (Heinz bodies) or on the thyroid gland, nor the digestive disturbances caused by action on the bacterial flora of the alimentary tract.

The compounds can, for example, be made up into preparations suitable for oral administration and lowering the blood sugar in the treatment of diabetes mellitus.

Pharmacological tests on the rabbit have shown that, when 400 milligrams of the compounds specified in the following table are administered in the form of the sodium salts per kilogram and per os, the reductions in the blood sugar level shown in the second column of the table are observed:

| No. | Compound | Lowering of blood sugar in the rabbit, percent |
|---|---|---|
| 1 | N-(naphthalene-(2)-sulfonyl)-N-cyclohexyl-urea | 45 |
| 2 | N-(naphthalene-(2)-sulfonyl)-N'-n-hexyl-urea | 40 |
| 3 | N-(naphthalene-(2)-sulfonyl)-N'-(3'-methoxy-propyl)-urea | 35 |
| 4 | N-(5.6.7.8-tetrahydronaphthalene-(2)-sulfonyl)-N'-(3'-methoxy-propyl)-urea | 30 |
| 5 | N-(5.6.7.8-tetrahydronaphthalene-(2)-sulfonyl)-N'-allyl-urea | 30 |
| 6 | N-(5.6.7.8-tetrahydronaphthalene-(2)-sulfonyl)-N'-isobutyl-urea | 30 |
| 7 | N-(4-phenoxy-benzene-sulfonyl)-N'-cyclohexyl-urea | 30 |
| 8 | N-(4-phenoxy-benzene-sulfonyl)-N'-n-hexyl-urea | 30 |

It is already known that the N-'4-amino-benzene-sulfonyl)-N-n-butyl-urea exhibits blood sugar lowering properties. Furthermore, it is known that, owing to its sulfanilyl character, this compound is also chemotherapeutically active. Since its use as oral antidiabetic necessitates the administration over a long period, it is desirable that the administered compound does not show a sulfanilyl character and, as far as possible, does not exert any other actions in order to exclude damages, for example of the bacterial flora of the alimentary tract, as well as allergies and the resistance of pathogenic germs to sulfanilyl amides.

The following examples serve to illustrate the invention but they are not intended to limit it thereto:

EXAMPLE 1

*N-(4-Phenoxy-Benzene-Sulfonyl)-N'-Isobutyl-Urea*

24.9 grams of 4-phenoxy-benzene-sulfamide are suspended in 66 cc. of acetone. The suspension is mixed with 132 cc. of a dilute sodium hydroxide solution containing 4 grams of caustic soda and 9.9 grams of isobutyl-isocyanate are slowly added dropwise, while stirring, at 20–25° C. to the solution obtained. The solution is stirred for another hour, filtered and the filtrate is acidified with dilute hydrochloric acid. There is obtained a crystalline precipitate that is sucked off, dried and recrystallized from ethyl acetate. The N-(4-phenoxy-benzene-sulfonyl)-N'-isobutyl-urea thus obtained melts at 176–178° C.

In analogous manner there is obtained from 49.8 grams of 4-phenoxy-benzene-sulfamide and 19.6 grams of n-butyl-isocyanate a good yield of N-(4-phenoxy-benzene-sulfonyl)-N'-n-butyl-urea melting at 149–151° C. after recrystallization from ethyl acetate.

EXAMPLE 2

*N-(4-Phenoxy-Benzene-Sulfonyl)-N'-Cyclohexyl-Urea*

49.8 grams of 4-phenoxy-benzene-sulfamide are suspended in 132 cc. of acetone. The sulfamide is dissolved as sodium salt by addition of 260 cc. of a dilute sodium hydroxide solution containing 8 grams of caustic soda. 25 grams of cyclohexylisocyanate are slowly added dropwise at 10° C., while stirring continuously. The whole is then stirred for another hour at room temperature, filtered, and the filtrate is acidified, while stirring, with dilute hydrochloric acid. The crystals that have separated are sucked off, washed with water, dried on a porous plate and recrystallized from ethyl acetate. There is obtained a good yield of N-(4-phenoxy-benzene-sulfonyl)-N'-cyclohexyl-urea melting at 191–193° C.

In analogous manner there is obtained from 49.8 grams of 4-phenoxy-benzene-sulfamide and 25 grams of n-hexyl-isocyanate a good yield of the N-(4-phenoxy-benzene-sulfonyl)-N'-n-hexyl-urea melting at 125–126° C.

EXAMPLE 3

*N-(Diphenyl-4-Sulfonyl)-N'-n-Butyl-Urea*

68 grams of diphenyl-4-sulfamide are dissolved, while moderately heating, in 500 cc. of a mixture made up from acetone and dioxane in a ratio of 1:1, 500 cc. of water and 12 grams of sodium hydroxide. The mixture is cooled to about 10° C. and there is then added in portions, while stirring—notwithstanding a more or less strong precipitation of the sodium salt of the sulfamide—a solution of 35 grams of n-butyl-isocyanate in 50 cc. of acetone. The reaction mixture is then stirred for another 2 hours at room temperature, the acetone and dioxane are removed as completely as possible on the steam bath under reduced pressure, and the precipitate already separating in the heat is suction-filtered (diphenyl-4-sulfamide melting at 230° C., which can again be reacted with isocyanate). The filtrate is acidified with concentrated hydrochloric acid until a pH 4 is attained. The white crystalline precipitate that has formed is redissolved for the most part by adding dropwise concentrated ammonia up to a pH-value of about 10 and separated from the undissolved matter as rapidly as possible by filtering with suction. The clear filtrate is acidified with dilute hydrochloric acid, the precipitate that has formed is sucked off and dissolved and reprecipitated twice from dilute ammonia (1:200) and dilute hydrochloric acid. After recrystallization from 1.2 liters of ethanol of 70 percent strength there is obtained a good yield of the N-(diphenyl-4-sulfonyl)-N'-n-butyl-urea in the form of white crystals melting at 174–175.5° C.

The salts of the N-(diphenyl-4-sulfonyl)-N'-n-butyl-urea are only moderately soluble in water.

EXAMPLE 4

*N-(Naphthalene-2-Sulfonyl)-N'-Isobutyl-Urea*

20.7 grams of naphthalene-2-sulfamide are dissolved by slight heating in a mixture of 110 cc. of 1 N-sodium hydroxide solution, 220 cc. of water and 180 cc. of acetone. The clear solution obtained is cooled to about 10–15° C. and—notwithstanding a crystalline precipitation of the sodium salt of the sulfamide—there is added, while stirring, within 15 minutes and in 5 portions a solution of 15 grams of isobutylisocyanate in 80 cc. of acetone. After all of the isocyanate has been added, the reaction mixture is stirred for about another hour and then acidified with dilute hydrochloric acid. The precipitate that has formed is sucked off, washed with water and warmed for 30 minutes at about 40° C., with 1 liter of dilute ammonia (1:50). The undissolved matter is filtered off, the solution is filtered through a clarifying layer and acidified again with dilute hydrochloric acid. The crude sulfonyl-urea thus obtained is once more—as described above—dissolved in dilute ammonia (1:50) and reprecipitated by means of dilute hydrochloric acid and recrystallized from 380 cc. of ethanol of 60% strength. The N-(naphthalene-2-sulfonyl)N'-isobutyl-urea obtained in a good yield melts at 180–182° C.

With the use of n-butyl-isocyanate there is obtained in analogous manner the N-(naphthalene-2-sulfonyl)-N'-n-butyl-urea melting at 151–152° C.

EXAMPLE 5

*N-(Naphthalene-2-Sulfonyl)-N'-Cyclohexyl-Urea*

10.3 grams of naphthalene-2-sulfamide are dissolved in a mixture of 55 cc. of 1 N-sodium hydroxide solution, 150 cc. of water and 150 cc. of acetone. The solution is cooled to 5–10° C. and, in spite of a more or less strong precipitation of crystals, a solution of 7.5 grams of cyclohexyl-isocyanate in 35 cc. of acetone is added in 5 portions, while shaking vigorously. When the total quantity of isocyanate has been added, the mixture is shaken for another hour. The reaction mixture is then diluted with 1.5 liters of water, separated from any undissolved matter and the solution is then adjusted to a pH 7.5–8 by means of 2 N-hydrochloric acid, whereby a further but very small quantity of unreacted naphthalene-2-sulfamide precipitates. After filtration the filtrate is acidified with dilute hydrochloric acid, the white precipitate that has separated is sucked off, washed with water and twice dissolved and reprecipitated from dilute ammonia (1:50) and from dilute hydrochloric acid. The product thus obtained is recrystallized from about 280 cc. of ethanol of 70% strength and represents the N-(naphthalene-2-sulfonyl)-N'-cyclohexyl-urea melting at 180–182° C.

EXAMPLE 6

*N-(5.6.7.8-Tetrahydro-Naphthalene-2-Sulfonyl)-N'-Isobutyl-Urea*

21 grams of 5.6.7.8-tetrahydronaphthalene-2-sulfamide melting at 137° C. are dissolved in a mixture of 110 cc. of 1 N-sodium hydroxide solution, 150 cc. of acetone and 180 cc. of water. To this solution is added in portions, while cooling and stirring, a solution of 11 grams of isobutyl-isocyanate in 30 cc. of acetone. After all of the isocyanate has been added, the mixture is stirred for another 30 minutes at room temperature and diluted with 1 liter of water. The undissolved matter is filtered off and the clear filtrate is slowly acidified with 2-N-hydrochloric acid. The precipitate, which is at first only semi-solid, crystallizes completely after being allowed to stand for some hours. The precipitate is sucked off, finely ground in a mortar, and recrystallized from 220 cc. of ethanol of 65% strength. The N-(5.6.7.8-tetrahydro-naphthalene-2-sulfonyl)-N'-isobutyl-urea is obtained in a good yield and in the form of white crystals. The melting point amounts to 138–140° C.

The N-(5.6.7.8-tetrahydro-naphthalene-2-sulfonyl)-N'-cyclohexyl-urea melting at 178–180° C. is obtained in analogous manner by reaction of 5.6.7.8-tetrahydro-naphthalene-2-sulfamide with cyclohexyl-isocyanate.

EXAMPLE 7

*N-(5.6.7.8-Tetrahydro-Naphthalene-2-Sulfonyl)-N'-Allyl-Urea*

22 grams of 5.6.7.8-tetrahydro-naphthalene-2-sulfonyl-carbamic acid methyl ester (prepared by reacting 5.6.7.8-tetrahydro-naphthalene-2-sulfamide with chloroformic acid methyl ester in the presence of acetone and ground anhydrous potassium carbonate) and 4.5 grams of dry allylamine are heated in 40 grams of 1:2-dichlorobenzene for 8 hours at 120° C. After cooling, the reaction mixture is shaken several times with 0.1 N-sodium hydroxide solution. For decolorization, the combined alkaline filtrates are treated with animal charcoal and subsequently acidified with dilute hydrochloric acid. The resinous precipitate obtained crystallizes after a short time. It is filtered off with suction, comminuted, digested several times with water and again sucked off. It is dissolved in about 250 cc. of dilute ammonia (1:25), the little undissolved matter is filtered off and the precipitate is reprecipitated by means of hydrochloric acid. After recrystallisation from about 250 cc. of ethanol of 60% strength a good yield of N-(5.6.7.8-tetrahydronaphthalene-2-sulfonyl)-N'-allyl-urea melting at 139–141° C. is obtained.

EXAMPLE 8

*N-(5.6.7.8-Tetrahydro-Naphthalene-2-Sulfonyl)-N'-(3'-Methoxy-Propyl)-Urea*

The N-(5.6.7.8-tetrahydro-naphthalene-2-sulfonyl)-N'-(3'-methoxy-propyl)-urea is obtained in the manner described in Example 7 by reaction of 22 grams of 5.6.7.8-tetrahydronaphthalene-2-sulfonyl-carbamic acid methyl ester with 7.1 grams of 3-methoxy-propylamine in 40 grams of 1:2-dichlorobenzene. After recrystallization from a mixture of diisopropylether and ethyl acetate in a proportion of 2:1, the product melts at 98–100° C.

EXAMPLE 9

*N-(Naphthalene-2-Sulfonyl)-N'-(2'-Ethyl-Thio-Ethyl)-Urea*

26.5 grams of N-(naphthalene-2-sulfonyl)-carbamic acid methyl ester and 10.5 grams of 2-ethylthio-ethyl-amine-(1) are heated for 90 minutes at 120° C. and the melt obtained is recrystallized from 1 liter of methanol of 60% strength. The sulfonyl-urea obtained in an excellent yield is readily soluble in dilute ammonia (1:25) and melts at 122–124° C.

EXAMPLE 10

*N-(Naphthalene-2-Sulfonyl)-N'-n-Butyl-Urea*

20.7 grams of naphthalene-2-sulfamide, 11.6 grams of n-butyl-urea, 55 grams of ground potassium carbonate and 150 cc. of glycol monomethyl ether are heated for 20 hours at 110° C., while stirring. The glycol ether is evaporated under reduced pressure and the residue is warmed with 2 liters of water. The undissolved matter is filtered off with suction, and, after cooling, the filtrate is acidified with 2 N-hydrochloric acid. The precipitate that has separated is filtered off with suction, dissolved in an excess of dilute ammonia solution (1:100), filtered once more and the filtrate is then acidified with hydrochloric acid. The precipitate is sucked off and recrystallized from ethanol of 60% strength. In this manner there is obtained the N-(naphthalene-2-sulfonyl)-N'-n-butyl-urea melting at 151–152° C.

EXAMPLE 11

*N-(Naphthalene-2-Sulfonyl)-N'-n-Propyl-Urea*

(a) N-NAPHTHALENE-2-SULFONYL-UREA 41.4 grams of naphthalene-2-sulfamide, 24.3 grams of potassium cyanate and 250 cc. of ethanol of 80% strength are boiled for 4½ hours on the steam bath. After cooling, the crystalline magma that has separated is washed with ethanol and dissolved in 4 liters of water while warming on the steam bath. The solution is clarified with charcoal and the filtrate is acidified in the hot state with 2 N-hydrochloric acid. A precipitate separates that is sucked off, washed with water and dried on the steam bath. There are obtained 42 grams of N-naphthalene-2-sulfonyl-urea melting at 190–192° C. (after recrystallization from methanol of 95% strength the melting point amounts to 192–193.5° C).

(b) N-(NAPHTHALENE-2-SULFONYL)-N'-n-PROPYL-UREA 25 grams of N-naphthalene-2-sulfonyl-urea, 23.6 grams of n-propylamine and 150 cc. of 1.2-dichlorobenzene are heated for 1 hour at 115–125° C. After cooling the reaction mixture, the precipitate is sucked off, warmed on the steam bath with about 1 liter of water and, after cooling, separated from the undissolved matter by filtration. The filtrate is clarified twice with charcoal and then acidified with dilute hydrochloric acid. The white crystalline precipitate is sucked off and recrystallized from 250 cc. of methanol of 50% strength. In this manner there is obtained the N-(naphthalene-2-sulfonyl)-N'-n-propyl-urea melting at 152–153° C.

EXAMPLE 12

*N-(Naphthalene-2-Sulfonyl)-N'-Cyclohexyl-Urea*

(a) N-(NAPHTHALENE-2-SULFONYL)-N'-CYCLOHEXYL-ISOUREA METHYL ETHER 28.4 grams of cyclohexyl-urea are slowly heated to 80° C. in the bath with 25.2 grams of dimethyl sulfate. The mixture becomes liquid and the temperature rises to 95° C. The mixture is left for several minutes in the bath, is then removed and 120 milliliters of water are added. A solution of 45.2 grams of naphthalene-2-sulfochloride in 120 milliliters of acetone is added and a solution of 18 grams of sodium hydroxide in 60 milliliters of water is added dropwise, while stirring, so that the solution remains weakly alkaline. During this time the temperature is maintained below 30° C. by cooling. An oil separates that crystallizes after further stirring and cooling. The product is sucked off and dried. A good yield of the N-(naphthalene-2-sulfonyl)-N'-cyclohexyl-isourea methyl ether melting at 107–109° C. is obtained.

(b) N-(NAPHTHALENE-2-SULFONYL)-N'-CYCLOHEXYLUREA 5 grams of the N-(naphthalene-2-sulfonyl)-N'-cyclohexyl-isourea methyl ether are heated in the bath for 30 minutes at 60° C. with 10 milliliters of concentrated hydrochloric acid. The mixture is allowed to cool. Water is added and the reaction product is filtered with suction. After recrystallization from ethanol of 70% strength, the N - (naphthalene-2-sulfonyl)-N'-cyclohexyl-urea is obtained. It melts at 180–182° C.

EXAMPLE 13

*N-(Naphthalene-2-Sulfonyl)-N'-n-Butyl-Urea*

(a) N-(NAPHTHALENE-2-SULFONYL)-N'-n-BUTYL-THIOUREA 41.4 grams of naphthalene-2-sulfamide, 350 cc. of acetone, 64 grams of ground potassium carbonate and 23 grams of n-butyl mustard oil are stirred for 10 hours at 55° C. The acetone is distilled off under reduced pressure, the residue is taken up in 3 liters of water, while warming, and the solution is clarified with charcoal. The filtrate is acidified with 2 N-hydrochloric acid and, after cooling, the crystalline precipitate is sucked off. After recrystallization from 800 cc. of methanol of 80% strength with addition of charcoal, the N-(naphthalene-2-sulfonyl)-N'-n-butyl-thiourea is obtained in a very good yield. After the product has been recrystallized once more from methanol of 70% strength, it shows a melting point of 130–132° C.

(b) N-(NAPHTHALENE-2-SULFONYL)-N'-n-BUTYL-UREA 32.2 grams of N-(naphthalene-2-sulfonyl)-N'-n-butyl-thiourea are dissolved in 150 cc. of acetone and, while stirring, there is added dropwise within 30 minutes a solution of 7.5 grams of sodium nitrite in 70 cc. of water. There are then added dropwise within 45 minutes, while cooling, 60 cc. of 5 N-acetic acid and the whole is stirred for another 2 hours at room temperature. By addition of 1 liter of water there is obtained a crystalline precipitate. The latter is filtered with suction, dissolved in dilute ammonia (1:75), separated from undissolved sulfur by filtration and the clear filtrate is re-acidified with hydrochloric acid. The precipitate obtained is filtered with suction, washed with water and recrystallized from dilute ethanol. There is obtained in a very good yield the N-(naphthalene-2-sulfonyl)-N'-n-butyl-urea melting at 151–152° C.

The desulfurization can also be carried out in similar manner by treating the corresponding sufonyl-thio-urea with salts of heavy metals, such as silver nitrate, in acetone of 70% strength.

EXAMPLE 14

N-(Naphthalene-2-sulfonyl)-N'-n-Butyl-Urea 35 grams of n-butyl-urea and 38 grams of dimethyl sulfate are mixed and heated in an oil bath previously heated to 100° C. When the internal temperature amounts to about 95° C., the reaction mixture begins to foam and the internal temperature rises rapidly to about 145° C. The reaction mixture is maintained at this temperature for about 2 minutes and subsequently cooled in water. The resulting clear melt is dissolved in a mixture of 80 cc. of water and 100 cc. of acetone. There is then added simultaneously from two dropping funnels, while cooling with ice and while stirring, a solution of 68 grams of naphthalene-2-sulfonic acid chloride in 200 cc. of acetone and a solution of 36 grams of sodium hydroxide in 200 cc. of water. The mixture is stirred for 1 hour at about 5° C. and subsequently for 3 hours at room temperature. After clarifying with charcoal, the acetone is evaporated under reduced pressure, the residue is diluted with 2 liters of water and heated with charcoal for 20 minutes on the steam bath. After repeated filtration the solution is acidified with hydrochloric acid and, after washing with water, the crystalline precipitate is recrystallized from about 800 cc. of methanol of 50% strength, while adding animal charcoal. There is obtained the N-(naphthalene-2-sulfonyl)-N'-n-butyl-urea melting at 151–152° C.

EXAMPLE 15

N-(Naphthalene-2-Sulfonyl)-N'-n-Hexyl-Urea 20.6 grams of naphthalene-2-sulfamide are dissolved in a mixture of 110 cc. of 1 N-sodium hydroxide solution, 300 cc. of water and 300 cc. of acetone. There is then added dropwise, at 0° C. and while stirring, notwithstanding a precipitate that might form, a solution of 15 grams of n-hexyl-isocyanate in 70 cc. of acetone. The mixture is stirred for another hour and diluted with 3 liters of water. The undissolved matter is filtered off with suction. The clear filtrate is acidified with dilute hydrochloric acid, the precipitate that has formed is taken up in a mixture of 5 liters of water and 24 cc. of concentrated ammonia, filtered and re-acidified with hydrochloric acid. The precipitated N-(naphthalene-2-sulfonyl)-N'-n-hexyl-urea melts at 128–129° C. after recrystallization from 280 cc. of ethanol of 70% strength.

EXAMPLE 16

N-(Naphthalene-2-Sulfonyl)-N'-(3-Methoxy-Propyl)-Urea 18.5 grams of N-(naphthalene-2-sulfonyl)-carbamic acid methyl ester and 6.3 grams of 3-methoxy-propyl-amine-(1) are heated for 40 minutes at 130° C. The cooled reaction mixture is taken up in dilute ammonia solution (1:25), while slightly warming, the solution obtained is separated from the little undissolved matter by filtering with suction, clarified with charcoal and acidified with hydrochloric acid. The crystalline precipitate is sucked off, washed with water and recrystallized from 200 cc. of ethanol of 60% strength. There is obtained a good yield of the N-(naphthalene-2-sulfonyl)-N'-(3'-methoxy-propyl)-urea melting at 113–115° C.

We claim:
1. The compound of the formula

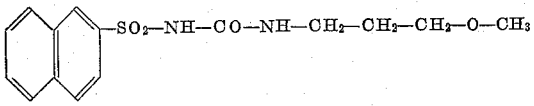

2. The compound of the formula

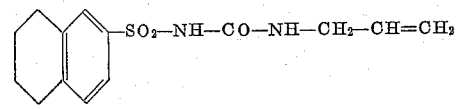

References Cited in the file of this patent

FOREIGN PATENTS

| 120,428 | Sweden | Oct. 16, 1947 |
| 919,464 | France | Nov. 25, 1946 |

OTHER REFERENCES

Petersen: "Chem. Ber.," volume 83 (1950), pages 554 to 557.

Ehrhart: "Naturwissenschaften," volume 43, February 1956, page 93.